United States Patent Office 3,794,700
Patented Feb. 26, 1974

---

3,794,700
PROCESS FOR THE PREPARATION OF METHYL-THIONOPHOSPHONATES
Richard Sehring and Wolfgang Buck, Ingelheim (Rhine), Germany, assignors to C. H. Boehringer Sohn, Ingelheim am Rhein, Germany
No Drawing. Filed Apr. 18, 1972, Ser. No. 245,179
Claims priority, application Germany, Apr. 19, 1971,
P 21 18 861.4; Feb. 2, 1972, P 21 04 777.4,
Feb. 7, 1972, P 22 05 564.7
Int. Cl. C07f 9/40, 9/41
U.S. Cl. 260—986                         4 Claims

ABSTRACT OF THE DISCLOSURE

A process for the preparation of methyl-thionophosphonates of the formula

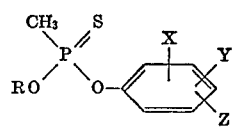

wherein
X and Y are each hydrogen, halogen or alkyl,
Z is hydrogen, halogen, alkyl, cyano, alkylthio, alkylsulfinyl, alkylsulfonyl, carboalkoxy, carbamoyl, sulfamoyl, alkylaminocarboxy, N-(mono- or di-) alkyl sulfamoyl or N-(mono- or di-)alkyl carbamoyl, and
R is alkyl or

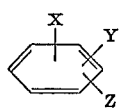

where X, Y and Z have the same meaning as defined above;
in general, the alkyl moieties are lower to medium alkyl, preferably methyl, ethyl or propyl; consisting essentially of the steps of reducing a compound of the formula

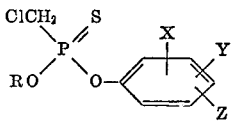

wherein X, Y, Z and R have the same meaning as above, with zinc and an organic acid at an elevated temperature.

---

This invention relates to novel methyl-thionophosphonic acid diphenyl esters, as well as to a novel process for preparing these esters.

More particularly the present invention furthermore relates to a novel process for preparing methyl-thionophosphonates of the formula

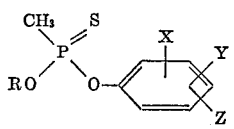   (I)

which exhibit insecticidal and acaricidal activity.

In addition, the present invention relates to novel methyl-thionophosphonic acid diphenyl esters of the formula

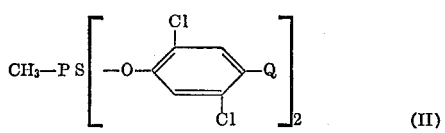   (II)

wherein Q is chlorine, bromine, iodine, lower alkylthio, lower alkylsulfinyl or lower alkylsulfonyl.

A portion of the compounds embraced by Formula I, namely those of Formula II, are new. They exhibit utility as insecticides and acaricides, especially against plant lice (aphids), houseflies and spider mites.

Several compounds of Formula I are known as highly effective pesticides (see German Pats. 1,044,812, 1,078,-124, 1,099,530, 1,124,034, 1,193,036 and 1,228,101; and U.S. Pat. 3,253,061). However, production of the compounds on a technical scale is expensive, so that their use for pest control has not reached great practical importance. Fundamentally, the difficulties are based on the fact that the compounds of the Formula I heretofore had to be produced by the reaction sequence

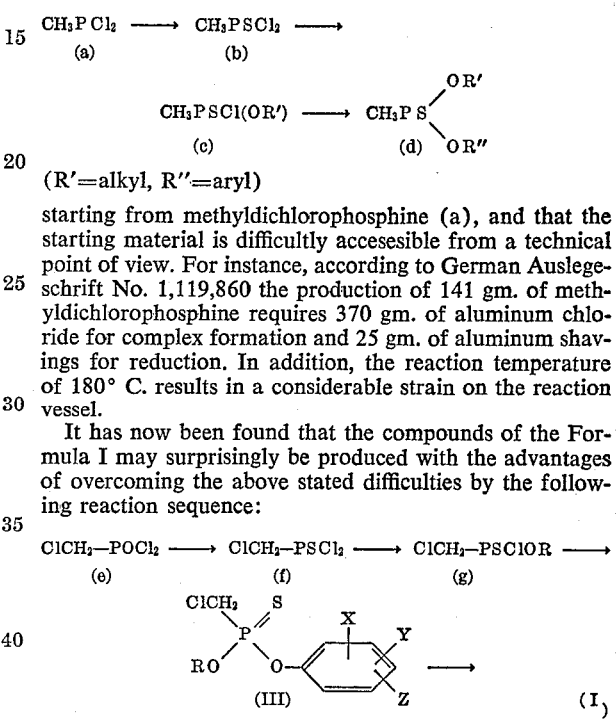

(R′=alkyl, R″=aryl)

starting from methyldichlorophosphine (a), and that the starting material is difficultly accesesible from a technical point of view. For instance, according to German Auslegeschrift No. 1,119,860 the production of 141 gm. of methyldichlorophosphine requires 370 gm. of aluminum chloride for complex formation and 25 gm. of aluminum shavings for reduction. In addition, the reaction temperature of 180° C. results in a considerable strain on the reaction vessel.

It has now been found that the compounds of the Formula I may surprisingly be produced with the advantages of overcoming the above stated difficulties by the following reaction sequence:

ClCH₂—POCl₂ ⟶ ClCH₂—PSCl₂ ⟶ ClCH₂—PSClOR ⟶
    (e)            (f)              (g)

[structure III] ⟶ [structure I]
                                          (III)        (I)

The starting compound (e) is a known compound and leads to Compound III by the above reactions which are known. Surprisingly, compounds of this type may be reduced to zinc/organic acid to the corresponding methylthionophosphonic acid esters of the Formula I with very good yields.

For performing this reduction process a suitable compound of the Formula III is dissolved in an organic acid. If desired, an organic solvent, inert under the reaction conditions, is added. The mixture is heated to the temperature range of about 50–120° C., and zinc dust is added thereto gradually in excess (1.2 to 2.5 gram-atom per mol of Compound III).

Organic acids which may be used according to the invention are, for example, carboxylic acids, preferably lower aliphatic carboxylic acids, such as formic acid, acetic acid or propionic acid. Suitable organic solvents which may be added are benzene, toluene, dioxane or chlorinated hydrocarbons. The addition of these solvents is primarily intended to increase the solubility of the diphenyl-thionophosphonates in the reaction medium. The choice of the organic acid and the additional organic solvent depends on the solubility of the starting material and the reaction product and on the desired reaction temperature.

In order to isolate the reaction product, the solution is evaporated, the residue is extracted using a suitable organic solvent, such as toluene, and the resulting solution is washed with hydrochloric acid, then with dilute sodium hydroxide and finally with water. After drying and evaporating the solvent from the solution, the reaction product remains as a colorless, viscous oil, which after some standing yields a white crystalline mass. The purification of the products may be effected by recrystallization or distillation.

In the case of the preparation of those compounds of Formula I wherein R represents a radical of the Formula II, both of the phenyl groups may be introduced simultaneously by reacting compound (f) with about 2 mols of the corresponding phenol in the presence of an acid binding agent or with about 2 mols of the corresponding phenolate.

Those compounds of the Formula I wherein R represents a phenyl radical of the Formula II may also be prepared by reacting methyl-thionophosphonic acid dichloride with a suitable phenolate or with a corresponding phenol in the presence of an acid binding agent, pursuant to the following reaction sequence:

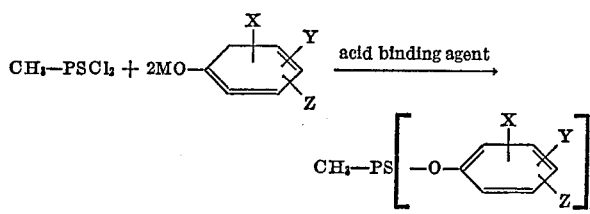

(M=hydrogen or 1 equivalent of a cation).

The following examples further illustrate the present invention and will enabe others skilled in the art to understand it more completely. It should be understood, however, that the invention is not limited solely to the particular examples given below.

EXAMPLE 1

O-ethyl-O-(4-cyano-phenyl)-methylthionophosphonate)

(a) O-ethyl-chloromethyl-thionophosphonic acid chloride.—Into a solution of 92 gm. of chloromethyl-thionophosphonic acid dichloride in 500 ml. of benzene 65 gm. of quinoline, dissolved in 25 ml. of ethanol were added dropwise, at a temperature of 10–20° C. The mixture was allowed to react for two hours at room temperature and was then vacuum fitered. The filtrate was washed with water, dried and then benzene was distilled off in vacuo. The crude product was purified by distillation. B.P. 50–51° C. at 760 mm. Hg. Yield: 93% of theory.

(b) O-ethyl-O-(4-cyano - phenyl)-chloromethyl-thionophosphonate.—Into 28.2 gm. of sodium 4-cyanophenolate in 50 ml. of methyl isobutyl ketone, maintained at room temperature, 38.6 gm. of the acid chloride obtained according to 1(a) above were added dropwise. The mixture was allowed to react for two hours, at 80° C.; it was then filtered and the solvent distilled off in vacuo. The residue was taken up in methylene chloride, shaken with sodium hydroxide solution and dried. After removal of the solvent in vacuo, the chloro methyl ester was obtained with a yield of 94% of theory.

(c) Reduction to the final product.—27.5 gm. of the chloromethyl ester obtained according to 1(b) in 50 ml. of glacial acetic acid were gradually admixed with 8 gm. of zinc powder. The mixture was stirred for five hours at 85–90° C., filtered and the glacial acetic acid was distilled off in vacuo. The residue was taken up in methylene chloride, washed with water, and the organic phase was dried with sodium sulfate. After having distilled off the solvent, O-ethyl-O-(4-cyano-phenyl)-methyl-thionophosphonate was obtained with a yield of 95.5% of theory. $n_D^{20}$: 1.5558. The same result was obtained, when the reduction was effected at 95–100° C.

EXAMPLE 2

O-ethyl-O-(2,5-dichloro-4-methylmercapto-phenyl)-methylthionophosphonate (a) O-ethyl - O - (2,5-dichloro - 4 - methylmercaptophenyl)-chloromethyl-thionophosphonate.—To a mixture of 96.5 gm. of the acid chloride obtained in Example 1(a) with 104.5 gm. of 2,5-dichloro-4-methylmercapto-phenol, 50 gm. of an aqueous 40% sodium hydroxide solution were added dropwise. The temperature was regulated so as not to exceed 50° C., and subsequently the mixture was heated slowly to 75° C. After one hour, the reaction mixture was diluted with 200 ml. of methylene chloride and stirred with an aqueous 5% sodium hydroxide solution. After drying, the organic phase was evaporated in vacuo. Yield: 162 gm. (98% of theory). Content of aliphatically bound chlorine: calculated: 10.72%, found: 10.8%.

(b) Reduction to final product.—By reduction of 36.6 gm. of the chloromethyl compound obtained in Example 2(a) and 50 ml. of glacial acetic acid with 8 gm. of zinc dust at a temperature of 90–95° C. analogous to Example 1(c), O-ethyl-O-(2,5-dichloro-4-methylmercapto-phenyl)-methyl-thionophosphonate was obtained with a yield of 97% of theory, M.P. 43–44° C.

Analysis.—Calculated: Cl, 21.42%. Found: Cl, 21.7%. When the reduction was carried out at 50–60° C., the reaction time was prolonged.

EXAMPLE 3

Using a procedure analogous to that described in Example 1, O-ethyl-O-(4-bromo-3,6-dichloro-phenyl)-methyl-thionophosphonate, $n_D^{20}$: 1.5841, was prepared by way of the intermediate O-ethyl-O-(4-bromo-3,6-dichlorophenyl)-chloro - methyl - thiononphosphonate. The above end product was thin-layer chromatographically uniform.

EXAMPLE 4

Using a procedure analogous to that described in Example 2, O-ethyl-O-(3,6-dichloro-4-methylsulfinyl - phenyl)-methyl-thionophosphonate, $n_D^{25}$: 1.5852, was prepared by way of the intermediate O-ethyl-O-(3,6-dichloro - 4-methylsulfinyl-phenyl) - chloromethyl-thionophosphonate. The above end product was thin-layer chromatographically uniform.

EXAMPLE 5

Using a procedure analogous to that described in Example 2, O-ethyl-O-(3-methyl-4-methylmercapto-phenyl)-methyl-thionophosphonate, $n_D^{25}$: 1.5797, was prepared by way of the intermediate O-ethyl-O-(3-methyl-4-methylmercaptophenyl)-chloromethyl - thionophosphonate. The above end product was thin-layer chromatographically uniform.

EXAMPLE 6

Using a procedure analogous to that described in Example 2, O-methyl-O-(4-methylmercapto-phenyl)-methyl-thionophosphonate, B.P. 108° C. at 1.01 mm. Hg, was prepared by way of the intermediate O-methyl-O-(4-methylmercapto-phenyl) - chloromethyl - thionophosphonate. The above end product was thin-layer chromatographically uniform.

EXAMPLE 7

Using a procedure analogous to that described in Example 2, O-methyl-O-(3-methyl-4-methylmercapto-phenyl)-methyl-thiononphosphonate, B.P. 96° C. at 0.01 mm. Hg, was prepared by way of the intermediate O-methyl-O-(3-methyl - 4 - methylmercapto-phenyl) - chloromethyl-thionophosphonate. The above end product was thin-layer chromatographically uniform.

EXAMPLE 8

Using a procedure analogous to that described in Example 1, O - ethyl - O - (3,4,6-trichloro-phenyl)-methyl-thionophosphonate, $n_D^{25}$: 1.5754, was prepared by way of the intermediate O - ethyl - O - (3,4,6-trichloro-phenyl)- chloromethylthionophosphonate. The above end product was thin-layer chromatographically uniform.

EXAMPLE 9

Using a procedure analogous to that described in Example 1, O-ethyl - O - (2,3 - dichloro-phenyl) - methyl-thionophosphonate, Cl calculated, 24.9%; Cl, found, 25.0%, was prepared by way of the intermediate O-ethyl-O - (2,3 - dichlorophenyl) - chloromethyl-thionophosphonate. The above end product was thin-layer chromatographically uniform.

EXAMPLE 10

Using a procedure analogous to that described in Example 1, O-ethyl-O-[3,6-dichloro-4-(N,N-dimethylamino-carboxy)-phenyl] - methyl-thionophosphonate, Cl calculated, 18.10%, Cl found, 18.05, N calculated, 3.57%, N found, 3.55%, was prepared by way of the intermediate O-ethyl-O-[3,6-dichloro-4-(N,N-dimethylamino-carboxy)-phenyl]-chloromethyl-thionophosphonate. The above end product was thin-layer chromatographically uniform.

EXAMPLE 11

Using a procedure analogous to that described in Example 2, O-ethyl-O-(3,6-dichloro-4-methylsulfonyl-phenyl)-methyl-thionophosphonate, M.P. 76–78° C., was prepared by way of the intermediate O-ethyl-O-(3,6-dichloro-4-methylsulfonyl-phenyl) - chloromethyl - thionophosphonate. The above end product was thin-layer chromatographically uniform.

EXAMPLE 12

Using a procedure analogous to that described in Example 2, O-ethyl-O-(3,6-dichloro-4-ethylmercapto-phenyl)-methyl-thionophosphonate, $n_D^{25}$: 1.5911, was prepared by way of the intermediate O-ethyl-O-(3,6-dichloro-4-ethylmercapto-phenyl) - chloromethyl-thionophosphonate. The above end product was thin-layer chromatographically uniform.

EXAMPLE 13

Using a procedure analogous to that described in Example 2, O-ethyl-O-(4-methylmercapto-phenyl)-methyl-thionophosphonate, $n_D^{25}$: 1.5874, was prepared by way of the intermediate O-ethyl-O-(4-methylmercapto-phenyl)-chloromethyl-thionophosphonate. The above end product was thin-layer chromatographically uniform.

EXAMPLE 14

Using a procedure analogous to that described in Example 2, O - ethyl - O - [2,3-dichloro-4-(N,N-dimethyl-sulfamoyl)-phenyl] - methyl - thionophosphonate, Cl calculated, 18.10%, Cl found, 18.00%, N calculated, 3.57%, N found, 3.50%, was prepared by way of the intermediate O-ethyl-O-[2,3-dichloro - 4 - (N,N-dimethyl-sulfamoyl)-phenyl]-chloromethyl-thionophosphonate. The above end product was thin-layer chromatographically uniform.

EXAMPLE 15

Using an procedure analogous to that described in Example 2, O-ethyl-O-[3,6 - dichloro - 4 - (N,N-diethyl-sulfamoyl)-phenyl] - methyl - thionophosphonate, M.P. 153–154° C., was prepared by way of the intermediate O-ethyl-O-[3,6 - dichloro-4-(N,N-diethyl-sulfamoyl)phenyl]-chloromethyl-thionophosphonate. The above end product was thin-layer chromatographically uniform.

EXAMPLE 16

Using a procedure analogous to that described in Example 1, O-n-propyl-O-(3 - chloro-4-bromo-phenyl)-methyl-thionophosphonate, halogen calculated: 48.0%, halogen found: 47.3%, was prepared by way of the intermediate O-n-propyl - O - (3-chloro-4-bromo-phenyl)-chloromethyl-thionophosphonate. The above end product was thin-layer chromatographically uniform.

EXAMPLE 17

Using a procedure analogous to that described in Example 1, O-n-butyl - O - (2-n-octyl-phenyl)-methyl-thionophosphonate, P calculated: 8.7%, P found: 8.5%, was prepared by way of the intermediate O-n-butyl-O-(2-n-octyl-phenyl) - chloromethyl - thionophosphonate. The above end product was thin-layer chromatographically uniform.

EXAMPLE 18

Using a procedure analogous to that described in Example 1, O - methyl - O - (4-carbethoxy-phenyl)-methyl-thionophosphonate, P calculated, 11.3%, P found, 11.2%, was prepared by way of the intermediate O-methyl-O-(4-carbethoxy-phenyl) - chloromethyl - thionophosphonate. The above end product was thin-layer chromatographically uniform.

EXAMPLE 19

Using a procedure analogous to that described in Example 1, O - ethyl - O - [2-(N,N-dimethyl-carbamoyl)-phenyl]-methyl-thionophosphonate, N calculated, 4.86%, N found, 4.75%, was prepared by way of the intermediate O - ethyl - O - [2-(N,N-dimethyl-carbamoyl)-phenyl]-chloromethyl-thionophosphonate. The above end product was thin-layer chromatographically uniform.

EXAMPLE 20

Using a procedure analogous to that described in Example 2, O - ethyl - O - (3,6-dichloro-4-n-hexylmercapto-phenyl)-methyl-thionophosphonate, Cl calculated, 17.7%, Cl found, 18.1%, P calculated, 7.6%, P found, 7.3%, was prepared by way of the intermediate O-ethyl-O-(3,6-dichloro - 4 - n - hexylmercapto-phenyl)-chloromethyl-thionophosphonate. The above end product was thin-layer chromatographically uniform.

EXAMPLE 21

Using a procedure analogous to that described in Example 1, O - ethyl - O - (3,6-dichloro-4-iodo-phenyl)-methyl-thionophosphonate, halogen calculated, 33.6%, halogen found, 34.0%, was prepared by way of the intermediate O - ethyl - O - (3,6-dichloro-4-iodo-phenyl)-chloromethyl-thionophosphonate. The above end product was thin-layer chromatographically uniform.

EXAMPLE 22

Using a procedure analogous to that described in Example 2, O - ethyl - O - [4-(n-butyl-sulfonyl)-phenyl]-methyl-thionophosphonate, P calculated, 9.2%, P found, 9.1%, was prepared by way of the intermediate O-ethyl-O-[4 - (n-butyl-sulfonyl)-phenyl]-chloromethyl-thionophosphonate. The above end product was thin-layer chromatographically uniform.

EXAMPLE 23

Using a procedure analogous to that described in Example 1, O - ethyl - O - (2,4-dimethyl-phenyl)-methyl-thionophosphonate, P calculated, 12.7%, P found, 12.4%, was prepared by way of the intermediate O-ethyl-O-(2,4-dimethyl-phenyl) - chloromethyl-thionophosphonate. The above end product was thin-layer chromatographically uniform.

EXAMPLE 24

Using a procedure analogous to that described in Example 2, O - ethyl-O-[3,6-dichloro-4-(n-octyl-sulfinyl)-phenyl]-methyl-thionophosphonate, Cl calculated, 15.95%, Cl found, 16.50%, P calculated, 6.95%, P found, 6.90%, was prepared by way of the intermediate O-ethyl-O-[3,6-dichloro - 4 - (n-octyl-sulfiinyl)-phenyl]-chloromethyl-thionophosphonate. The above end product was thin-layer chromatographically uniform.

EXAMPLE 25

Using a procedure analogous to that described in Example 1, O-ethyl-O-(2-carbethoxyx-4-chloro-phenyl)-methyl-thionophosphonate, Cl calculated, 11.0%, Cl found, 11.2%, was prepared by way of the intermediate O-ethyl-O - (2-carbethoxy-4-chloro-phenyl)-chloromethyl-thionophosphonate. The above end product was thin-layer chromatographically uniform.

EXAMPLE 26

Using a procedure analogous to that described in Example 1, O - ethyl-O-(2-n-butyl-phenyl)-methyl-thionophosphonate, P calculated, 11.4%, P found, 11.0%, was prepared by way of the intermediate O-ethyl-O-(2-butyl-phenyl)-chloromethyl-thionophosphonate. The above end product was thin-layer chromatographically uniform.

EXAMPLE 27

Using a procedure analogous to that described in Example 1, O - methyl-O-(2,4-dichloro-phenyl)-methyl-thionophosphonate, B.P. 102–104° C. at 0.2 mm. Hg, was prepared by way of the intermediate O-methyl-O-(2,4-dichloro - phenyl) - chloromethyl-thionophosphonate. The above end product was thin-layer chromatographically uniform.

EXAMPLE 28

Using a procedure analogous to that described in Example 1, O-n-propyl-O-(2,5-dichloro-4-bromo-phenyl)-methyl-thionophosphonate, M.P. 50–51° C., were prepared by way of the intermediate O - n-propyl-O-(2,5-dichloro-4-bromo - phenyl) - chloro-methyl-thionophosphonate. The above end product was thin-layer chromatographically uniform.

EXAMPLE 29

Using a procedure analogous to that described in Example 1, O - isopropyl - O-(2,5-dichloro-4-bromo-phenyl)-methyl-thionophosphonate, M.P. 51° C., was prepared by way of the intermediate O - isopropyl-O-(2,5-dichloro-4-bromo - phenyl) - chloromethyl-thionophosphonate. The above end product was thin-layer chromatographically uniform.

EXAMPLE 30

Using a procedure analogous to that described in Example 1, O-methyl-O-(2,5-dichloro-4-bromo-phenyl)-methyl-thionophosphonate, M.P. 52–53° C., was prepared by way of the intermediate O - methyl-O-(2,5-dichloro-4-bromo-phenyl) - chloromethyl-thionophosphonate. The above end product was thin-layer chromatographically uniform.

EXAMPLE 31

15.0 gm. (0.041 mol) of O-ethyl-O-(2,5-dichloro-4-methylmercapto - phenyl) - chloromethyl - thionophosphonate, prepared according to Example 2(a) were dissolved in 100 ml. of formic acid. The temperature was maintained at 70° C., and while stirring the solution, a total of 7 gm. of zinc dust were added at a rate of 1 gm. per hour. After ten hours the reaction was finished. The mixture was filtered, the filtrate was evaporated in vacuo and the residue was dissolved in toluene. The solution was then washed with dilute hydrochloric acid, dilute sodium hydroxide solution and water and dried. After having distilled off the solvent, 12.2 gm. (90% of theory) of O-ethyl - O-(2,5-dichloro-4-methylmercaptophenyl)-methyl-thionophosphonate were obtained as a colorless oil, which was purified by distillation (B.P. 158–160° C. at 0.1 mm. Hg) or by crystallization from ethanol and benzene; M.P. 48–50° C.

EXAMPLE 32

Using a procedure analogous to that described in Example 31, O - ethyl-O-(2,5-dichloro-4-methylmercapto-phenyl)-methyl-thionophosphonate, yield: 90% of theory, was prepared by way of the intermediate O-ethyl-O-(2,5-dichloro - 4-methylmercapto-phenyl)-chloromethyl thionophosphonate. The intermediate was dissolved in 50 ml. of acetic acid and 50 ml. of dioxane instead of in formic acid.

EXAMPLE 33

Using a procedure analogous to that described in Example 31, O - ethyl-O-(2,5-dichloro-4-methylmercapto-phenyl)-methyl-thionophosphonate, was prepared by way of the intermediate O - ethyl-O-(2,5-dichloro-4-methylmercapto-phenyl) - chloromethyl-thionophosphonate. The intermediate was dissolved in a mixture of 50 ml. of formic acid and 50 ml. of propionic acid. The reaction time was 10 hours.

EXAMPLE 34

O,O'-di-2,5-dichloro-4-methylmercapto-phenyl)-methyl-thionophosphonate (a) O,O' - di-(2,5-dichloro-4-methylmercapto-phenyl)-chloromethyl-thionophosphonate.—92 gm. (0.5 mol) of chloromethyl-thionophosphonic acid dichloride and 219.2 gm. (1.05 mol) of 2,5-dichloro-4-methylmercapto-phenyl were dissolved in 600 ml. of ethylene chloride at 50° C. A solution of 42 gm. (1.05 mol) of sodium hdyroxide in 100 ml. of water was added dropwise while stirring the solution. The temperature increased to about 75° C. The mixture was refluxed for one to two hours. Then the ethylene chloride was distilled off and substituted by toluene. The aqueous phase was separated; the organic solution was washed with dilute sodium hydroxide, dried and concentrated. 230.5 gm. (87.5% of theory) of a colorless, viscous oil were obtained which soon solidified forming a white crystalline mass. M.P. 124–125° C. (from glacial acetic acid).

*Analysis.* Cl calculated: 33.5%. Cl found: 33.44%.

(b) O,O' - di-(2,5-dichloro-4-methylmercapto-phenyl)-methyl-thionophosphonate.—230.5 gm. (0.437 mol) of the compound obtained according in (a) were dissolved in 600 ml. of acetic acid at 90–100° C. 43.0 gm. (0.657 gram-atom) of zinc dust were added gradually while stirring at 90–100° C., over a period of about three hours. The reaction mixture was concentrated, and then about 1.5 liters of toluene and about 200 ml. of hydrochloric acid (corresponding to 150 ml. of concentrated hydrochloric acid) were added. The mixture was stirred until the precipitate had been dissolved. Thhe toluene phase was separated and washed with 2N NaOH and water, dried and evaporated. 214 gm. of a white crystalline powder were obtained as a residue (99% of theory); M.P. 133–135° C. (from glacial acetic acid).

EXAMPLE 35

O,O'-di-(4-bromo-2,5-dichloro-phenyl)-methyl-thionophosphate

Using a procedure analogous to that described in Example 34(a), O,O'-di-(4-bromo - 2,5 - dichloro-phenyl)-chloro-methyl-thionophosphonate was prepared from chloromethyl-thionophosphonic acid dichloride and 4-bromo-2,5-dichloro-phenyl. 29.5 gm. of the chloro-methyl-thionophosphonate were dissolved in 75 ml. of acetic acid. The mixture was heated to 80–85° C.; and while stirring the mixture an initial amount of 3.2 gm. of zinc dust were added thereto. After about one hour another portion of 3.2 gm. of zinc dust were added, and the mixture was allowed to react one hour more. The mixture was then cooled and vacuum-filtered. The filtrate was washed with methylene chloride and the combined filtrates were evaporated. The residue was taken up in methylene chloride and the solution was washed with dilute sulfuric acid, dilute NaOH and water. The solution was then dried and evaporated, yielding 23 gm. (83% of theory) of the desired compound, M.P. 92–93° C.

EXAMPLE 36

Using a procedure analogous to that described in Example 35, 22 gm. of O,O'-di-(2,4,5-trichloro-phenyl)-methyl-thionophosphonate, M.P. 73° C., were obtained by way of 25.2 gm. of the intermediate O,O'-di-(2,4,5-trichloro-phenyl)-chloromethyl-thionophosphonate. This intermediate was dissolved in 75 ml. of glacial acetic acid and reduced analogous to Example 35. The reaction product was isolated as described in Example 35. Yield: 85% of theory.

EXAMPLE 37

Using a procedure analogous to that described in Example 34, O,O'-di-(2,4'-dichloro-phenyl) - methyl-thionophosphonate, M.P. 39–42° C., Cl calculated: 35.2%, Cl found: 35.0%, was prepared by way of the intermediate O,O'-di-(2,4-dichloro-phenyl) - chloromethyl - thionphosphonate, M.P. 64–66° C. The above end product was a colorless, viscous oil, which slowly solidified. Yield: 87.5% of theory.

EXAMPLE 38

Using a procedure analogous to that described in Example 34, O,O'-di-2,5-dihcloro-4-iodo-phenyl) - methyl-thionophosphonate was prepared by way of the intermediate O,O'-di-(2,5-dichloro-4-indo - phenyl)-chloromethyl-thionphosphonate.

EXAMPLE 39

Using a procedure analogous to that described in Example 34, O,O'-di-(4-cyano-phenyl)-methyl - thionophosphonate was prepared by way of the intermediate O,O'-di-(4-cyanophenyl)-chloromethyl-thionophosphonate.

EXAMPLE 40

Using a procedure analogous to that described in Example 34, O,O'-di-(2,5-dichloro-4-methylmercapto-phenyl)-methyl-thionophosphonate was repeated by way of the intermediate O,O' - di(2,5 - dichloro-4-ethylmercaptophenyl)-chloromethyl-thionophosphonate.

EXAMPLE 41

Using a procedure analogous to that described in Example 34, O,O'-di-(2,5-dichloro-4-methylsulfonyl-phenyl)-methyl-thionophosphonate was prepared by way of the intermediate O,O'-di(2,5-dichloro-4-methylsulfonyl-phenyl)-chloromethyl-thionophosphonate.

EXAMPLE 42

Using a procedure analogous to that described in Example 34, O,O'-di-(4-methylmercapto-phenyl) - methyl-thionophosphonate was evaporated by way of the intermediate O,O'-di-(4-methylmercapto-phenyl)-chloromethyl-thionophosphonate.

EXAMPLE 43

Using a procedure analogous to that described in Example 34, O,O'-di(3-methyl-4-methylmercapto - phenyl)-methyl-thionophosphonate was prepared by way of the intermediate O,O'-di-(3-methyl-4-methylmercapto-phenyl)-chloro-methyl-thionophosphonate.

EXAMPLE 44

O,O'-di-(2,5-dichloro-4-methylmercapto-phenyl)-methyl-thionophosphonate 46.4 gm. (0.2 mol) of sodium 2,5-dichloro-4-methylmercapto-phenoxide were suspended in 300 ml. of acetonitrile. 14.9 gm. (1.1 mol) of methyl-thionophosphonic acid dichloride were added, while stirring, to the suspension at room temperature. The mixture was stirred overnight, then filtered, and the filtrate was evaporated. The residue was dissolved in toluene, and the solution was washed with 1 N sodium hydroxide and with water, dried and evaporated. The residue solidified, forming a white crystalline mass. Yield: 40.5 gm. (82% of theory); M.P. 132° C.

EXAMPLE 45

O,O'-di-(4-bromo-2,5-dichloro-phenyl)-methyl-thionophosphonate 29.8 gm. (0.2 mol) of methyl-thionophosphonic acid dichloride were dissolved in 500 ml. of ethylene chloride, and 97 gm. (0.4 mol) of 4 - bromo-2,5-dichlorophenyl were added. Then 16 gm. (0.4 mol) of sodium hydroxide in 50 ml. of water were added dropwise and the mixture was stirred overnight. The organic phase was then separated, washed with 1 N sodium hydroxide and water, and evaporated. The residue solidified after a short time, forming a white crystalline mass. Yield: 98 gm. (87.5%) of theory); M.P. 93° C.

EXAMPLE 46

Using a procedure analogous to that described in Example 44, O,O'-di-(2,5-dichloro-4-iodo-phenyl) - methyl-thionophosphonate was prepared from methyl-thionophosphonic acid dichloride and sodium 2,5-dichloro-4-iodo-phenoxide.

EXAMPLE 47

Using a procedure analogous to that described in Example 44, O,O'-di-(4-cyano-phenyl)-methyl - thionophosphonate was prepared from mehyl-thionophosphonic acid dichloride and sodium 4-cyano-phenoxide.

EXAMPLE 48

Using a procedure analogous to that described in Example 44, O,O'-di-(2,5-dichloro-5-ethylmercapto-phenyl)-methyl-thionophosphonate was prepared from methyl-thionophosphonic acid dichloride and sodium 2,5-dichloro-4-ethylmercapto-phenoxide.

EXAMPLE 49

Using a procedure analogous to that described in Example 44, O,O' - di-(2,5-dichloro-4-methylsulfonyl-phenyl)-methyl-thionophosphonate was prepared from methyl-thiono phosphonic acid dichloride and sodium 2,5-dichloro-4-methylsulfonyl-phenoxide.

EXAMPLE 50

Using a procedure analogous to that described in Example 45, O,O' - di-(4-methylmercapto-phenyl)-methyl-thionophosphonate was prepared from methyl-thionophosphonate was prepared from methyl-thionophosphonic acid dichloride and 4-methylmercapto-phenol.

EXAMPLE 51

Using a procedure analogous to that described in Example 45, O,O'-di-(3-methyl-4-methylmercapto-phenyl)-methyl-thionophosphonate was prepared from methyl-thionophosphonic acid dichloride and 3-methyl-4-methyl-mercaptophenol.

EXAMPLE 52

Using a procedure analogous to that described in Example 45, O,O' - di-(2,4-dichloro-phenyl)-methyl-thionophosphonate was prepared from methyl-thionophosphonic acid dichloride and 2,4-dichloro-phenol.

EXAMPLE 53

Using a procedure analogous to that described in Example 45, O,O' - di - (2,4,5 - trichloro-phenyl)methyl-thionophosphonate was prepared from methyl-thionophosphonic acid dichloride and 2,4,5-trichloro-phenol.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A process for the preparation of a methylthionophosphonate of the formula

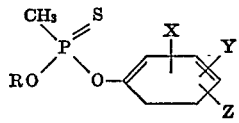

wherein

X and Y are each hydrogen, halogen or alkyl of 1 to 8 carbon atoms,

Z is hydrogen, halogen, alkyl of 1 to 8 carbon atoms, cyano, alkylthio of 1 to 6 carbon atoms, alkyl-sulfinyl of 1 to 8 carbon atoms, alkylsulfonyl of 1 to 4 carbon atoms, carboalkoxy of 2 to 3 carbon atoms, carbamoyl, sulfamoyl, alkylaminocarboxy of 2 to 7 carbon atoms, N-(mono- or di-)alkyl sulfamoyl of 1 to 6 carbon atoms, or N-(mono- or di-) alkyl carbamoyl of 2 to 7 carbon atoms, and R is alkyl of 1 to 4 carbon atoms or

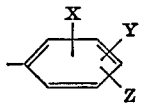

where X, Y and Z have the same meaning as defined above, consisting of essentially of the steps of reducing a compound of the formula

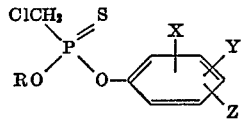

wherein X, Y, Z and R have the same meaning as defined above, with zinc and an organic acid at an elevated temperature, and recovering the said methyl-thionophosphonate.

2. The process of claim 1, in which the reduction is performed by zinc and a lower aliphatic carboxylic acid.

3. The process of claim 1, in which an inert organic solvent is added to the reaction medium.

4. The process of claim 1, in which the reaction temperature is from about 50° C. to about 120° C.

References Cited

UNITED STATES PATENTS 3,689,508   9/1972   Schoenewaldt _____ 260—986 X

LEWIS GOTTS, Primary Examiner

R. L. RAYMOND, Assistant Examiner

U.S. Cl. X.R.

260—940, 941, 943, 944, 909, 961, 973, 985

UNITED STATES PATENT OFFICE

CERTIFICATE OF CORRECTION

Patent No. 3,794,700     Dated Feb. 26, 1974

Inventor(s) RICHARD SEHRING and WOLFGANG BUCK

It is certified that error appears in the above-identified patent and that said Letters Patent are hereby corrected as shown below:

Col. 2, line 47 - correct "to" (first occurrence) to read --with--.

Col. 7, line 2  - correct "carbethoxyx to read --carbethoxy--.

Col. 7, line 14 - correct "(2-butyl-" to read --(2-n-butyl- --

Col. 9, line 25 - correct "indo" to read --iodo--.

Col. 9, line 50 - correct "evaporated" to read --prepared--.

Signed and sealed this 5th day of November 1974.

(SEAL)
Attest:

McCOY M. GIBSON JR.
Attesting Officer

C. MARSHALL DANN
Commissioner of Patents